United States Patent
Sakamoto (10) Patent No.: US 10,239,269 B2
(45) Date of Patent: Mar. 26, 2019

(54) RIGID CORE AND METHOD FOR MANUFACTURING PNEUMATIC TIRE USING SAME

(71) Applicant: Sumitomo Rubber Industries Ltd., Kobe-shi, Hyogo (JP)

(72) Inventor: Masayuki Sakamoto, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 129 days.

(21) Appl. No.: 14/426,057

(22) PCT Filed: Aug. 20, 2013

(86) PCT No.: PCT/JP2013/072146
§ 371 (c)(1),
(2) Date: Mar. 4, 2015

(87) PCT Pub. No.: WO2014/050363
PCT Pub. Date: Apr. 3, 2014

(65) Prior Publication Data
US 2015/0210026 A1    Jul. 30, 2015

(30) Foreign Application Priority Data
Sep. 27, 2012    (JP) .................. 2012-214849

(51) Int. Cl.
*B29D 30/06*    (2006.01)
*B29D 30/12*    (2006.01)
(Continued)

(52) U.S. Cl.
CPC .......... *B29D 30/0629* (2013.01); *B29C 33/02* (2013.01); *B29D 30/0661* (2013.01);
(Continued)

(58) Field of Classification Search
CPC ............ B29D 30/0629; B29D 30/0661; B29D 30/12; B29C 33/02
See application file for complete search history.

(56) References Cited

U.S. PATENT DOCUMENTS

| | | | | |
|---|---|---|---|---|
| 5,431,873 A | * | 7/1995 | Vandenberghe | ........ B29C 33/10 249/114.1 |
| 6,113,833 A | * | 9/2000 | Ogawa | ................... B29D 30/12 156/110.1 |

(Continued)

FOREIGN PATENT DOCUMENTS

| | | |
|---|---|---|
| EP | 0 893 237 A2 | 1/1999 |
| JP | 2-147411 A | 6/1990 |

(Continued)

OTHER PUBLICATIONS

International Search Report issued in PCT/JP2013/072146, dated Nov. 26, 2013.

(Continued)

*Primary Examiner* — Jacob T Minskey
*Assistant Examiner* — Melody Tsui
(74) *Attorney, Agent, or Firm* — Birch, Stewart, Kolasch & Birch, LLP (57) ABSTRACT

According to the present invention, the cycle time is reduced for a core removal step while suppressing displacement of the affixing position for the rubber member during a green-tire forming step. This rigid core has a ring-shaped core body having a tire forming surface for molding the inner surface of a pneumatic tire. The core body is formed from a plurality of core segments that are split in the circumferential direction and movable in the tire radius direction. The surface roughness (Ra) of the outer surface of the core segments forming the tire forming surface is 2.0-20.0 μm.

4 Claims, 5 Drawing Sheets

(51) Int. Cl.
*B29C 33/02* (2006.01)
*B29L 30/00* (2006.01)
*B29C 33/42* (2006.01)

(52) U.S. Cl.
CPC ............ *B29D 30/12* (2013.01); *B29C 33/424* (2013.01); *B29D 2030/0616* (2013.01); *B29L 2030/00* (2013.01)

(56) References Cited

U.S. PATENT DOCUMENTS

2008/0088057 A1* 4/2008 Henrotte ................. B29C 33/10 264/219
2011/0247740 A1* 10/2011 Ohara ................. B29D 30/0629 152/454

FOREIGN PATENT DOCUMENTS

| | | |
|---|---|---|
| JP | 7-195380 A | 8/1995 |
| JP | 11-58385 A | 3/1999 |
| JP | 2003-320595 A | 11/2003 |
| JP | 2007-136998 A | 6/2007 |
| JP | 2007-253412 A | 10/2007 |
| JP | 2007-320248 A | 12/2007 |
| JP | 2011-161896 A | 8/2011 |
| JP | 2011-167979 A | 9/2011 |
| WO | WO 2009/095099 A1 | 8/2009 |

OTHER PUBLICATIONS

Extended European Search Report dated Apr. 21, 2016, in European Patent Application No. 13840367.0.

* cited by examiner

RIGID CORE AND METHOD FOR MANUFACTURING PNEUMATIC TIRE USING SAME

TECHNICAL FIELD

The present invention relates to a rigid core for molding an inner surface of a pneumatic tire.

BACKGROUND ART

In recent years, a core molding method using a rigid core has been proposed in order to mold a pneumatic tire accurately, as shown in the Patent documents 1 and 2. The rigid core includes an outer surface having substantially same shape with an inner surface of the tire. The rigid core can be divided into a plurality of core segments which are movable radially inward of the tire. In the core molding method, unvulcanized rubber components, e.g. an inner liner, a carcass ply, a belt ply, a sidewall rubber, and a tread rubber are sequentially arranged on the outer surface of the rigid core to form a green tire thereon. The green tire with the rigid core is inserted in a space of a vulcanization mold, and then the green tire is vulcanized between the rigid core and the outer mold to form a pneumatic tire.

After vulcanization, the core segments are moved in a tire radial direction to be taken out from the pneumatic tire.

Unfortunately, it may be difficult to take out the core segments from the pneumatic tire because the outer surface of each core segment has adhered strongly to the inner surface of the pneumatic tire. Accordingly, a forcible movement of the core segments may cause damages or an undesirable deformation on the pneumatic tire. Furthermore, in order to prevent such an undesirable deformation of the tire, another way where the core segments are taken out slowly from the tire may be considered. Unfortunately, the way described above may offer a long manufacturing cycle time and low productivity of the tires.

In order to solve the problem described above, modification of the outer surface shape of the rigid core, an increase of the divided number of core segments, and coating the outer surface of the rigid core with something may be considered.

Unfortunately, the modification of the outer surface shape of the rigid core may change the inner surface shape of the tire so that a tire performance lowers. Furthermore, the increase of the divided number of core segments may require a lot of cost for modifying the current equipments. Furthermore, coating the surface of the rigid core may cause a low adhesiveness between the rigid core and an unvulcanized rubber component. Therefore, it may be difficult to arrange the unvulcanized rubber component onto the rigid core accurately.

RELATED ART DOCUMENTS

Patent Documents

[Patent Document 1] Japanese Unexamined Patent Application Publication 2011-161896
[Patent Document 2] Japanese Unexamined Patent Application Publication 2011-167979

SUMMARY OF THE INVENTION

Problem to be Solved by the Invention

The present invention has a main object of providing a rigid core that may be easily separated from an inner surface of the vulcanized tire so as to shorten a cycle time for taking out the rigid core from the tire while suppressing deviation of arrangement of an unvulcanized rubber component during a green tire molding process.

Means for Solving the Problem

In accordance with an aspect of the invention, there is provided a rigid core comprising a ring-shaped core main body having a tire molding surface for molding an inner surface of a pneumatic tire, the core main body comprising a plurality of circumferentially divided core segments each movable along a tire radial direction, and each core segment comprising an outer surface forming the tire molding surface having a surface roughness Ra of from 2.0 to 20.0 μm.

In accordance with another aspect of the invention, the outer surface of each core segment comprises an upper portion located radially outward with respect to a maximum width position of the core segment, and a lower portion located radially inward with respect to the maximum width position of the core segment. The lower portion comprises the surface roughness Ra smaller than that of the upper portion.

In accordance with another aspect of the invention, the outer surface of each core segment comprises an upper portion located radially outward with respect to a maximum width position of the core segment, and a lower portion located radially inward with respect to the maximum width position of the core segment. The lower portion comprises the surface roughness Ra in a range of not less than 10 μm.

In accordance with another aspect of the invention, there is provided a method for manufacturing a pneumatic tire using the rigid core according to any one of claims 1 to 3, the method comprising a green tire molding process to form a green tire by arranging an unvulcanized rubber component on the tire molding surface of the rigid core, a vulcanization process to vulcanize the green tire with the rigid core in a vulcanization mold to form a vulcanized tire, and a core removal process to take out the core segments of the rigid core from the vulcanized tire by pulling the core segments toward radially inward of the tire.

Effect of the Invention

The rigid core in accordance with the present invention comprises a plurality of core segments each having an outer surface of a surface roughness Ra of from 2.0 to 20.0 μm. Such a rough surface may maintain an excellent stick property with an unvulcanized rubber component so as to suppress deviation of arrangement of the unvulcanized rubber component during a green tire molding process. Furthermore, such a rough surface may be easily separated from an inner surface of the vulcanized tire so as to shorten a cycle time for taking out the rigid core from the tire.

MODE FOR CARRYING OUT THE INVENTION

Figure 1:
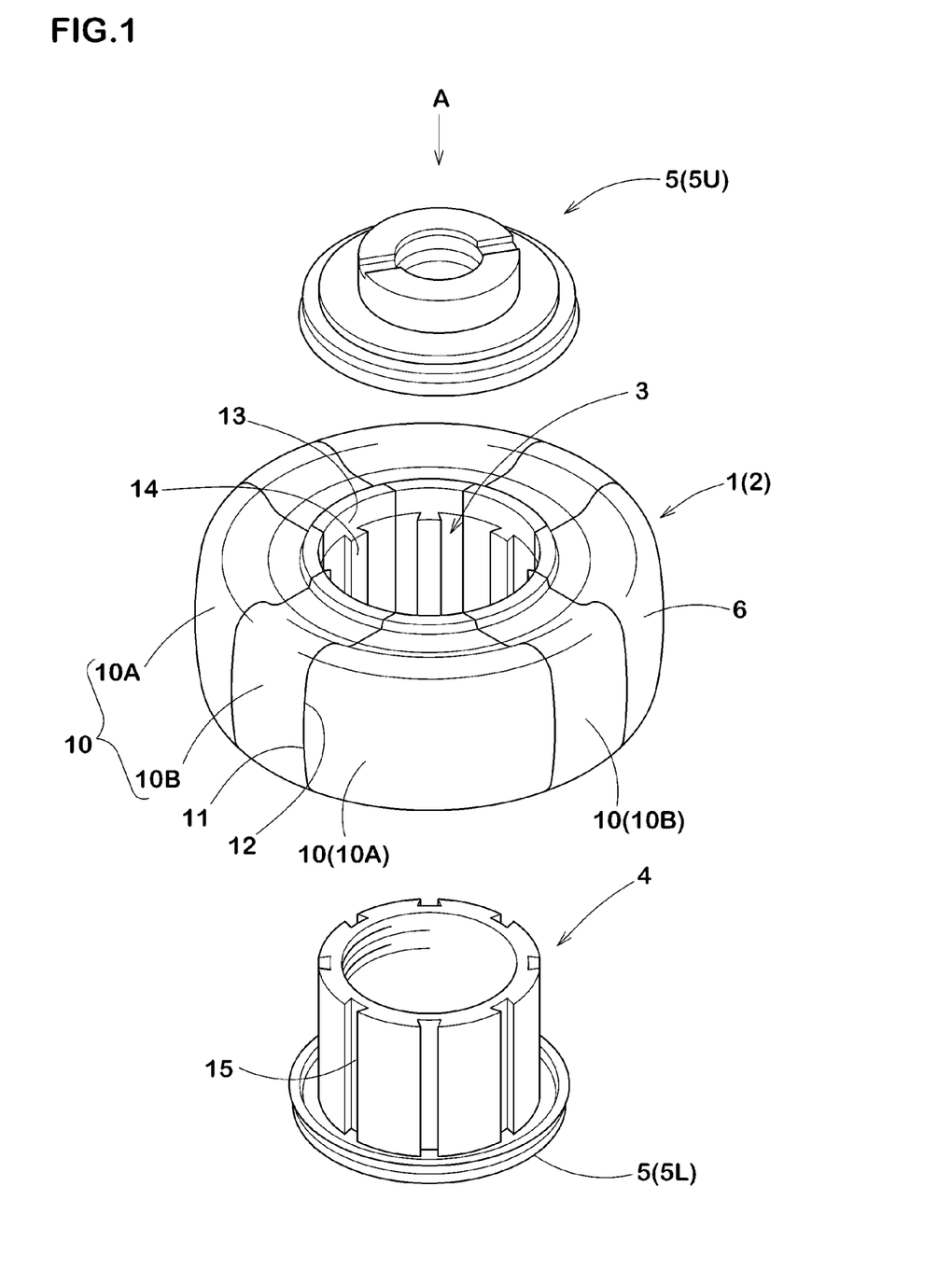
FIG. 1 is an exploded perspective view of a rigid core in accordance with an embodiment of the present invention.

An embodiment of the present invention will be explained below with reference to the accompanying drawings. FIG. 1 illustrates an exploded perspective view of a rigid core 1. As shown in FIG. 1, the rigid core 1 comprises a core main body 2 having a center hole 3, a cylindrical center piece 4 being configured to be inserted into the center hole 3, and a pair of side plates 5 each arranged on axially both sides of the core main body 2.

Figure 2:
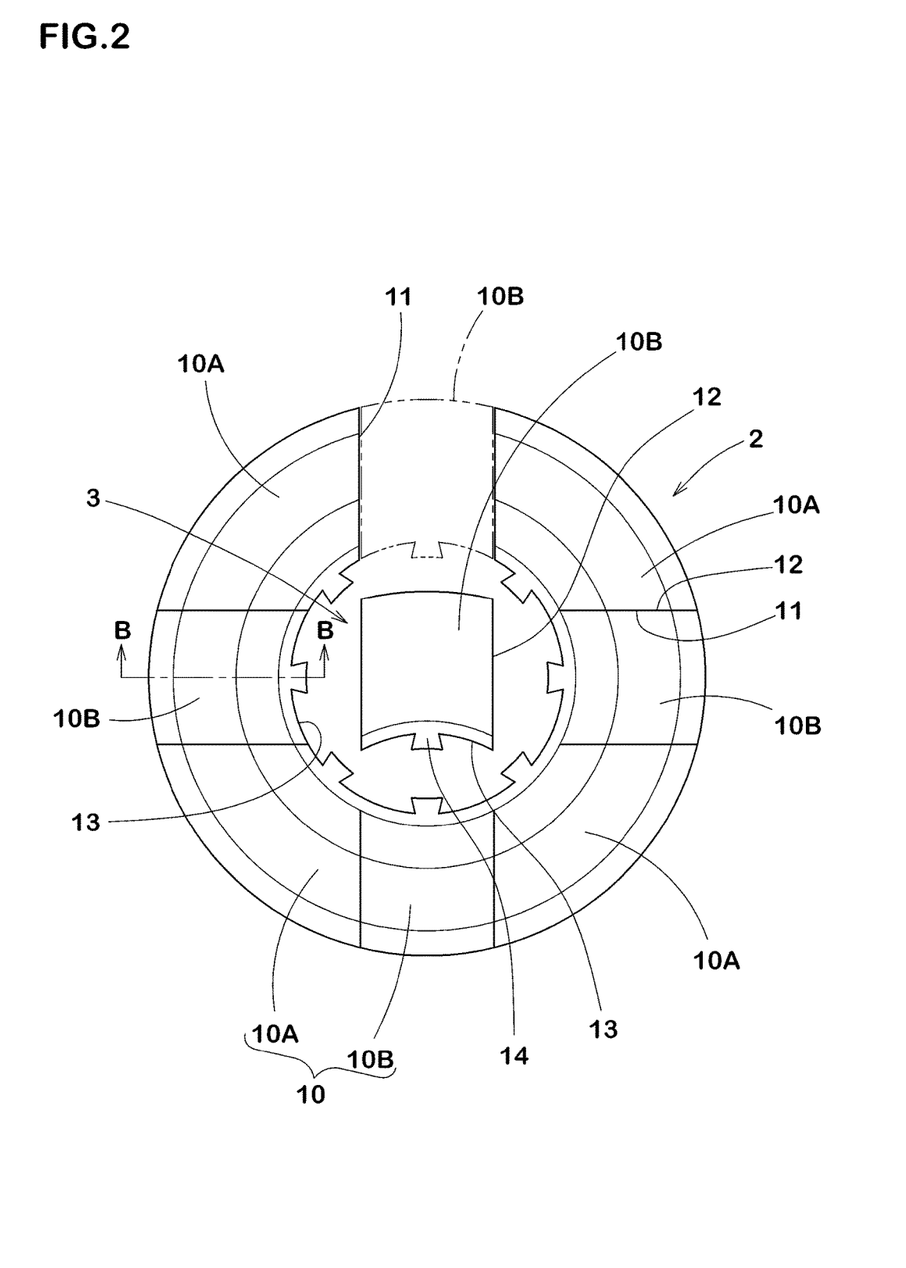
FIG. 2 is a plan view of the rigid core viewed from an arrow A of FIG. 1.

The core main body 2 is configured as a ring shape having an outer surface including a tire molding surface 6 which corresponds to an inner surface of a pneumatic tire to be molded. The pneumatic tire comprises a toroidal shape having a tread portion, a sidewall portion, and a bead portion. As shown in FIG. 2, the core main body 2 has a round shape viewed from one of the side plate (hereinafter, it may be referred as "side shape") with a concentric center hole 3.

As shown in FIG. 2, the core main body 2 comprises a plurality of circumferentially divided core segments 10. The core segments 10 comprise a first core segment 10A and a second core segment 10B which are alternately arranged in the circumferential direction.

The first core segment 10A includes a pair of inclined end faces 11 such that a circumferential length between end faces 11 reduces radially inward. Thus, the first core segment 10A has a fan-shaped side view. The second core segments 10B includes a pair of inclined end faces 12 such that a circumferential length between end faces 12 increases radially inward. In this embodiment, the core main body 2 comprises eight core segments 10 including four first and second core segments each.

As shown in FIG. 1, the core main body 2 may form the tire molding surface 6 that corresponds to the inner surface of the pneumatic tire by connecting the end face 11 of the first core segment 10A and the end face 12 of the second core segment 10B one another so that respective outer surfaces 16 of the core segments 10 continue in the circumferential direction (connecting state).

As shown in FIG. 2, each core segment 10 is movable in the radial direction of the tire. In the connecting state, the respective second segments 10B can be movable radially inward at first, and then the respective first segments 10A can be movable radially inward.

In this embodiment, each core segment 10 is provided with a dovetail tenon 14 extending in the axial direction of the tire. The dovetail tenon 14 faces in the center hole 3 and is positioned a circumferential middle of the inner surface 13 of the core segment 10.

As shown in FIG. 1, the center piece 4 has a cylindrical shape having an outer diameter approximately same with an inner diameter of the center hole 3. The center piece 4 is provided on its outer surface with a plurality of dovetail grooves 15 where the respective dovetail tenons 14 can be inserted to engage. By inserted the center piece 4 into the center hole 3 of the core main body 2 at the connecting state, the respective dovetail tenons 14 can be engaged with the respective dovetail grooves 15. Thus, the center piece 4 and the core segments 10 can be firmly fixed one another while allowing only a relative motion in the axial direction of the tire.

A first side plate 5L is firmly fixed to one side of the center piece 4, and a second side plate 5U is detachably fixed to the other side of the center piece 4. Each side plate 5L and 5U can prevent from axial motion of each core segment 10 in relation to the center piece 4, thereby providing a firmly fixed core main body 2 with the connecting state. When the core main body 2 is taken apart, the second side plate 5U is detached from the center piece 4 at first, and then the center piece 4 with the first side plate 5L is pulled up from the center hole 3 of the core main body 2. Then the second core segments 10B may be moved radially inward in order to remove it from the center hole 3.

Figure 3:
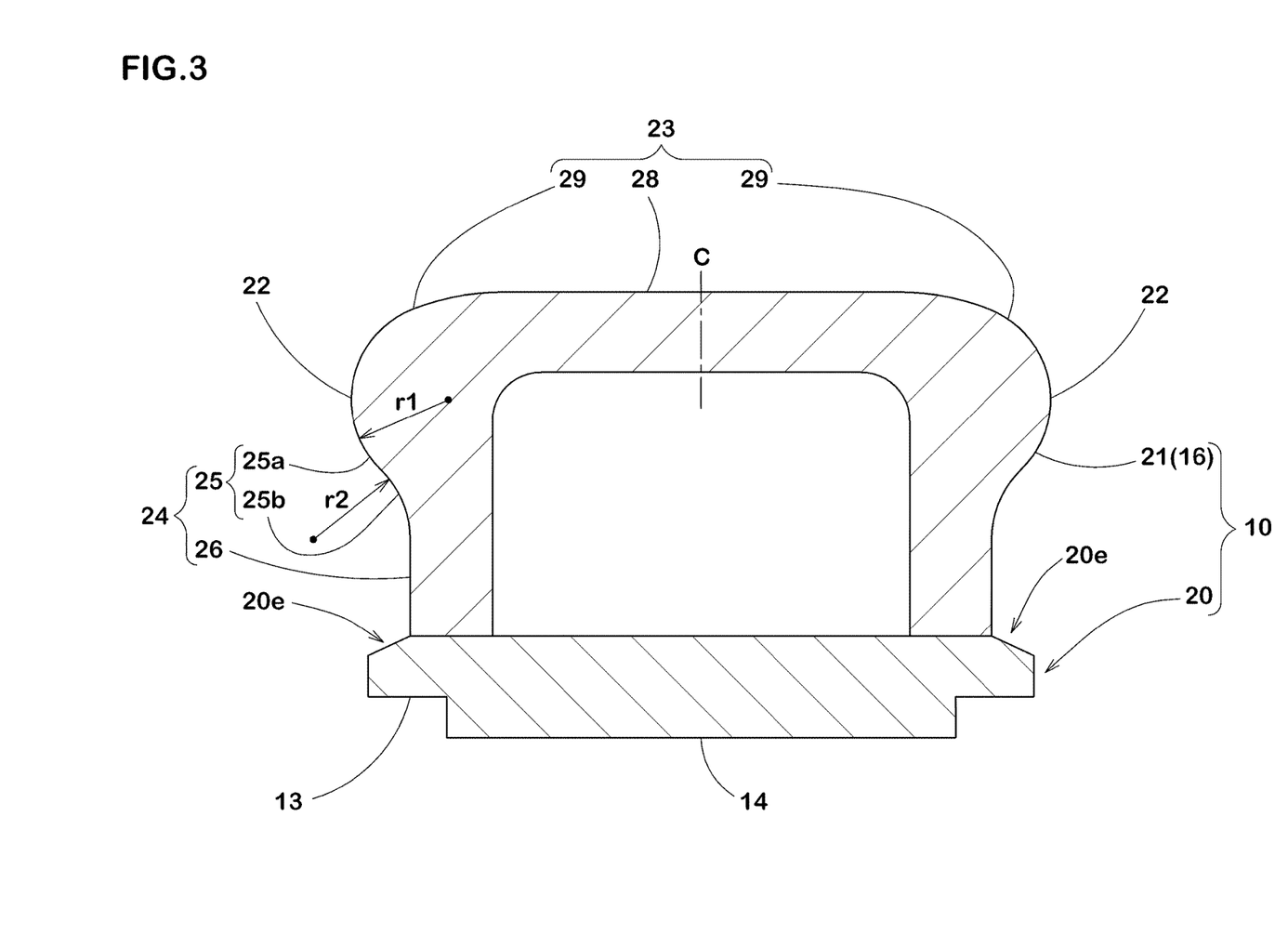
FIG. 3 is a cross sectional view taken along a line B-B of FIG. 1.

FIG. 3 illustrates a cross-sectional view of one of the core segments 10 taken along a radial direction of the tire. As shown in FIG. 3, the core segment 10 comprises a support base 20 forming an inner surface 13 of the center hole 3, and a segment main body 21 having an outer surface 16. The tire molding surface 6 is formed by continuously connecting the respective outer surfaces 16 of the segment main bodies 21.

The inner surface 13 of the support base 20 is provided with the dovetail tenons 14 for connecting the center piece 4. In addition, the support base 20 is firmly fixed to the segment main body 21 at its axially both ends.

The respective segment main body 21 may be made of metallic material having an excellent thermal conductivity, e.g., aluminum alloy. The outer surface 16 comprises an upper portion 23 located radially outward with respect to a maximum width position 22 of the core segment 10, and a lower portion 24 located radially inward with respect to the maximum width position 22.

The upper portion 23 comprises a tread forming portion 28, and a pair of shoulder forming portions 29. The tread forming portion 28 is an approximately flatly extending surface including a core equator C to mold an inner surface of the tread portion of the tire. Each of the shoulder forming portion 29 extends from the tread forming portion 28 to the maximum width position 22 of the core segment 10 in a curved fashion to mold an inner surface of the shoulder and sidewall portions of the tire.

The lower portion 24 comprises a curved portion 25, and a straight portion 26. The curved portion 25 extends radially inward from the maximum width position 22 in an S-shaped manner. The straight portion 26 extends radially inward from the curved portion 25 in a straight manner. The curved portion 25 includes a convexly curved portion 25a with a radius of r1 and its center located inwardly of the segment main body 21, and a concave curved portion 25b with a radius of r2 and its center located outwardly of the segment main body 21. The lower portion 24 can mold an inner surface of the sidewall and bead portions of the tire.

A method for manufacturing a pneumatic using the rigid core 1 comprises a green tire forming process, a vulcanization process, and a core removal process from the tire. In the green tire forming process, unvulcanized rubber components with sticky can be arranged on the outer surface 16 of the rigid core 1 to form a green tire, thereby forming a green tire on the rigid core. As for the unvulcanized rubber components, an inner liner rubber, a carcass ply, a belt ply, a bead core, a clinch rubber, a sidewall rubber, and a tread rubber may be used. In order to arrange the unvulcanized rubber components on the rigid core 1, a various kinds of method may be employed, e.g. a method of winding a ribbon like rubber strip along in the circumferential direction of the tire; a method of arranging axially long rubber strips in the circumferential direction of the tire with a butt-joint; and a method of winding a sheet-like rubber component and splicing its both ends.

Figure 4:
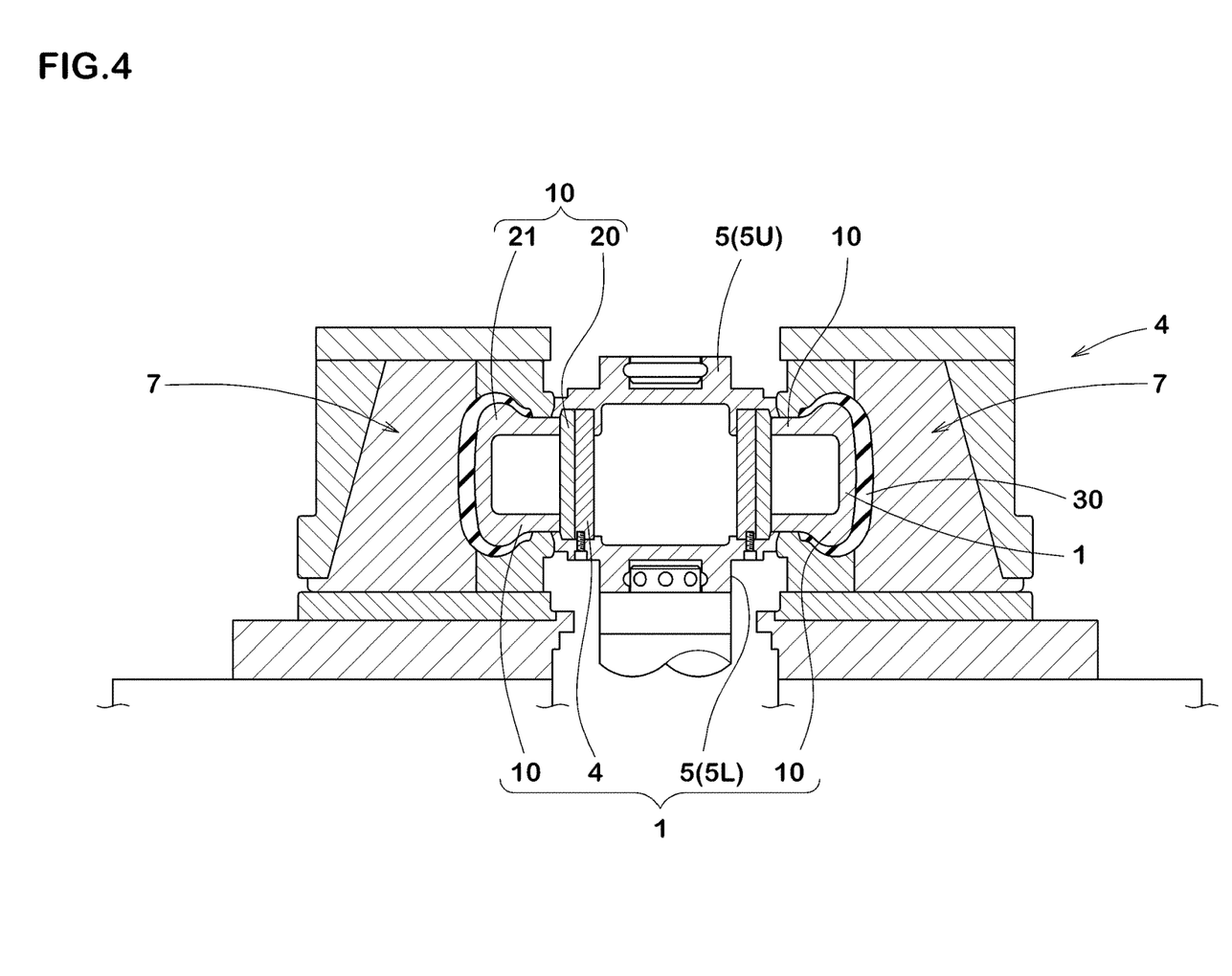
FIG. 4 is a cross sectional view of the rigid core and a vulcanization device.

As shown in FIG. 4, in the vulcanization process, the green tire 30 with the rigid core 1 is placed in a vulcanization mold 7 so that the green tire 30 is vulcanized and molded by a cavity formed between the rigid core 1 and the vulcanization mold 7.

Figure 5:
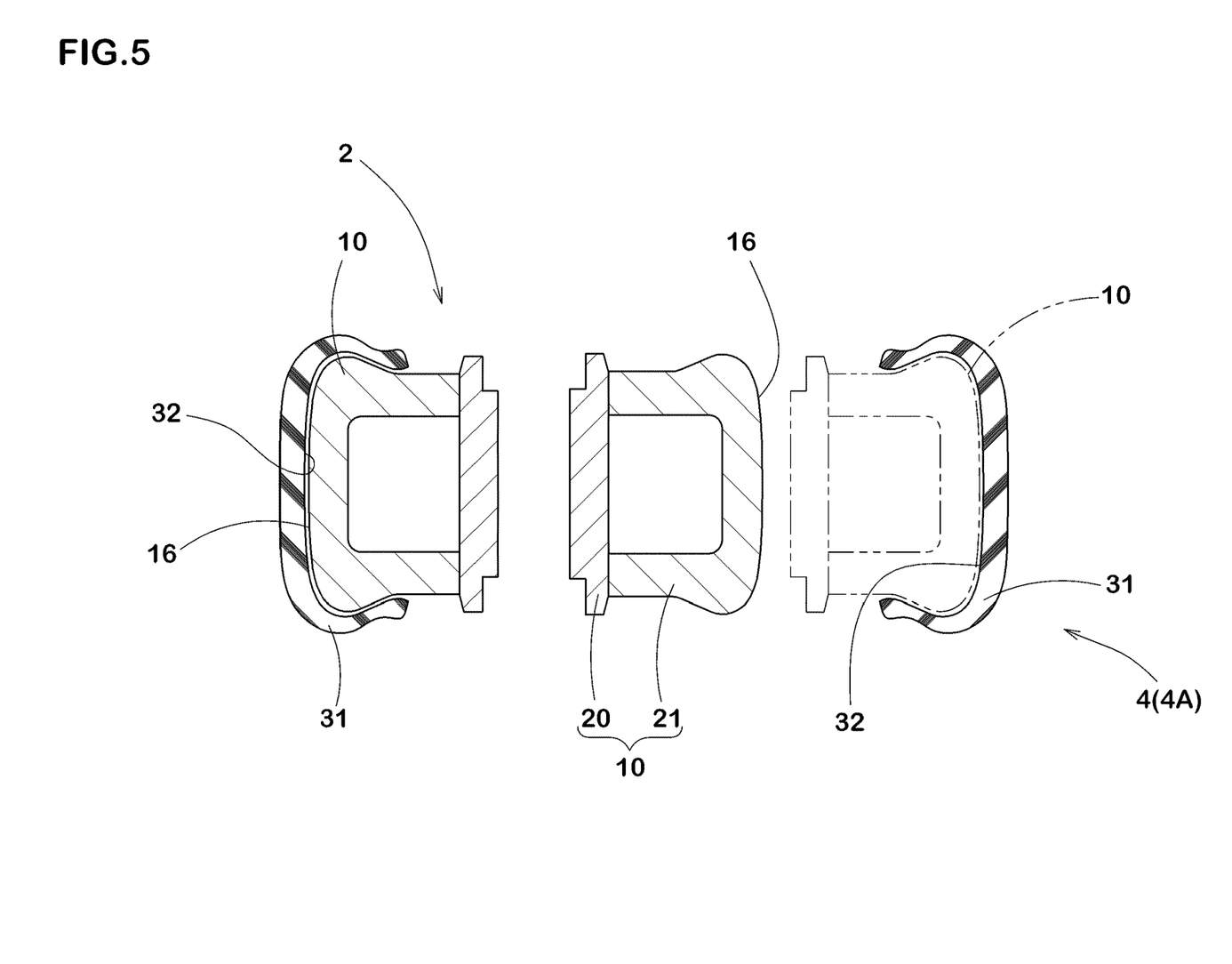
FIG. 5 is an explanation view of a core removal process for taking out the rigid core.

As shown in FIG. 5, in the core removal process, the core segments 10 are pulled out radially inward from the vulcanized tire 31. In the conventional method, since the core segments firmly adhere to the inner surface 32 of the tire 31, it can be difficult to tear off the core segments from the tire 31. Accordingly, a problem that the tire 31 is deformed undesirably may be caused when one of the core segments is forced to pull radially inward. Conventionally, in order to prevent the deformation of the tire 31, it has been proposed cooling sufficiently both the tire 31 and the core 1. Unfortunately, this conventional proposal may offer a long cycle time.

In the rigid core 1 in accordance with the present invention, each core segment 10 comprises the outer surface 16 having a surface roughness Ra in a range of from 2.0 to 20.0 μm. Since the surface with the surface roughness Ra may offer an excellent adhesiveness with unvulcanized rubber components, the unvulcanized rubber components can be adhered on a correct position of the rigid core 1 during the green tire forming process. Furthermore, an excellent detachability between the core segments 10 and the inner surface 32 of the tire 31 after vulcanization can be offered, thereby preventing from undesirable deformation of the tire 31 caused by a poor detachability between the core segments 10 and the inner surface 32 while reducing cooling time of the rigid core 1. Accordingly, the present invention may offer an excellent productivity of the tire by reducing the time of the core removal process.

In this description, the surface roughness Ra refers to arithmetic average roughness Ra defined by JIS B0601-2001.

When the surface roughness Ra is less than 2.0 μm, an excellent detachability between the inner surface of the tire and the core segments 10 may not be offered, thereby lowering the productivity of the tire due to undesirable long cycle time of the core removal process. On the other hand, when the surface roughness Ra is more than 20.0 μm, the adhesiveness between the core segment and the unvulcanized rubber components may lower, thereby lowering uniformity of the tire due to unvulcanized rubber components arranged on an incorrect position at the green tire forming process.

Preferably, the lower limit of the surface roughness Ra of the outer surface 16 of the core segments 10 may be set in a range of not less than 5.0 μm, more preferably not less than 10 μm. Preferably, the upper limit of the surface roughness Ra of the outer surface 16 of the core segments 10 may be set in a range of not more than 18 μm, more preferably not more than 15 μm. Such a core segment 10 having the surface roughness may further improve the advantages described above.

As shown in FIG. 3, the lower portion 24 of the core segment 10 has an area smaller than that of the upper portion 23. In addition, the lower portion 24 includes a steep curved portion 25 and the straight portion 26. Accordingly, molding failure may be caused in the green tire molding process such as slippage or separation of a rubber component adhered on the lower portion 24 prior to vulcanization. In view of the above, the lower portion 24 preferably has a surface roughness Ra smaller than that of the upper portion 23 to prevent from slippage of the rubber member against the lower portion 24.

In the core removal process where the core segments are moved radially inwardly of the tire, the bead portion of the tire is separated from the lower portion 24 at the beginning, thereby entering the air into a gap therebetween. Then the whole inner surface 32 of the tire 31 can be separated from the core segments 10. Accordingly, it is important that ease of separation of the tire to the lower portion 24. Preferably, the lower portion 24 of the core segment 10 has a surface roughness Ra in a range of not less than 10 μm, more preferably not less than 15 μm.

In the process where the upper portion 23 is separated from the inner surface 32 of the tire 31, the shoulder forming portions 29 are separated from the inner surface of the tire at the beginning, thereby entering the air into a gap therebetween. Then the tread forming portion 28 is separated from the inner surface of the tire. Accordingly, the shoulder forming portions 29 preferably have a surface roughness Ra larger than that of the tread forming portion 28. Thus, the upper portion 23 may be separated easily from the inner surface of the tire.

While the particularly preferable embodiments of the present invention have been described in detail, the present invention is not limited to the illustrated embodiments, but can be modified and carried out in various aspects.

Comparison Test

Rigid cores having a basic structure of FIG. 1 and Table 1 were prototyped. Then, the performance of these rigid cores was tested according to the following procedures.

Cycle Time of Rigid Core Removal Process:

In each process where a pneumatic tire was manufactured using each of the respective rigid cores, cycle time of the core removal process was measured. The test results are indicated using an index of Ex. 1 being 100. The smaller the value, the better the performance is.

Uniformity:

A radial force variation (RFV) of each test tire manufactured by each of the rigid cores was measured using a uniformity measurement machine in accordance with uniformity test conditions of JASO C607: 2000. The test results are indicated using an index of Ex. 1 being 100. The larger the value, the poorer the uniformity is. This means that a large slippage of a rubber component happened in the green tire molding process.

The test results are shown in Table 1.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ref. 2 | Ref. 3 | Ref. 4 | Ref. 5 |
|---|---|---|---|---|---|---|---|---|---|---|---|---|---|---|---|
| Tire size | 205/55R16 | 205/55R16 | 205/55R16 | 205/55R16 | 205/55R16 | 205/55R16 | 205/55R16 | 205/55R16 | 205/55R16 | 205/55R17 | 205/55R18 | 205/55R18 | 205/55R18 | 205/55R19 | 205/55R19 |
| Number of core segments | 8 | 8 | 8 | 8 | 8 | 8 | 8 | 8 | 8 | 8 | 8 | 8 | 8 | 8 | 8 |
| Surface roughness Ra of upper portion (μm) | 1 | 2 | 3 | 5 | 5 | 5 | 10 | 10 | 10 | 20 | 20 | 23 | 25 | 27 | 30 |

TABLE 1-continued

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ref. 2 | Ref. 3 | Ref. 4 | Ref. 5 |
|---|---|---|---|---|---|---|---|---|---|---|---|---|---|---|---|
| Surface roughness Ra of lower portion (μm) | 1 | 2 | 2 | 2 | 5 | 10 | 2 | 5 | 10 | 10 | 20 | 23 | 25 | 27 | 30 |
| Cycle time of core removal process (Index) | 123 | 100 | 78 | 80 | 62 | 53 | 77 | 59 | 49 | 48 | 47 | 47 | 47 | 47 | * |
| Uniformity (Index) | 100 | 100 | 100 | 100 | 100 | 105 | 103 | 103 | 104 | 105 | 105 | 120 | 120 | 125 | * |

* Due to a sticking failure of a rubber component to the rigid core at green tire molding process, the green tire could not be molded.

From the test results, it was confirmed that the rigid cores in accordance with the present invention may prevent from slippage of a rubber component during the green tire molding process while shortening cycle time of rigid core removal process.

DESCRIPTION OF THE REFERENCE NUMERALS

1 Rigid core
2 Core main body
10 Core segment
16 Outer surface of core segment

The invention claimed is:

1. A rigid core comprising:
a ring-shaped core main body having a tire molding surface for molding an inner surface of a pneumatic tire;
the core main body comprising a plurality of circumferentially divided core segments each movable along a tire radial direction; and
each core segment comprising an outer surface forming the tire molding surface as a surface which is in contact directly with a rubber of a pneumatic tire to be molded during a tire vulcanizing process, wherein:
the outer surface of each core segment comprises:
an upper portion located radially outward with respect to a maximum width position of the core segment, wherein the upper portion is used to mold an inside of tread and shoulder portions of the pneumatic tire, and
a lower portion located radially inward with respect to the maximum width position of the core segment, wherein the lower portion is used to mold an inside surface of sidewall and bead portions of the pneumatic tire, and wherein:
the lower portion has a surface roughness Ra in a range of not less than 10 μm, and
the upper portion has a surface roughness greater than that of the lower portion and not more than 20 μm.

2. A method for manufacturing a pneumatic tire using the rigid core according to claim 1, the method comprising:
a green tire molding process to form a green tire by arranging an unvulcanized rubber component on the tire molding surface of the rigid core;
a vulcanization process to vulcanize the green tire with the rigid core in a vulcanization mold to form a vulcanized tire; and
a core removal process to take out the core segments of the rigid core from the vulcanized tire by pulling the core segments toward radially inward of the tire.

3. The rigid core according to claim 1, wherein
the upper portion comprises a tread forming portion having an approximately flatly extending surface including a core equator to mold an inner surface of a tread portion of the pneumatic tire and a pair of shoulder fowling portions each extending from the tread forming portion to the maximum width position of the core segment in a curved fashion to mold an inner surface of the shoulder and sidewall portions of the pneumatic tire, and
wherein each of the shoulder forming portions has a surface roughness Ra larger than that of the tread forming portion.

4. A method for manufacturing a pneumatic tire using the rigid core according to claim 3, the method comprising:
a green tire molding process to form a green tire by arranging an unvulcanized rubber component on the tire molding surface of the rigid core;
a vulcanization process to vulcanize the green tire with the rigid core in a vulcanization mold to form a vulcanized tire; and
a core removal process to take out the core segments of the rigid core from the vulcanized tire by pulling the core segments toward radially inward of the tire.

* * * * *